US011940423B2

(12) United States Patent
Yamamoto

(10) Patent No.: US 11,940,423 B2
(45) Date of Patent: Mar. 26, 2024

(54) GAS CHROMATOGRAPH

(71) Applicant: SHIMADZU CORPORATION, Kyoto (JP)

(72) Inventor: Ryosuke Yamamoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 36 days.

(21) Appl. No.: 17/140,265

(22) Filed: Jan. 4, 2021

(65) Prior Publication Data
US 2021/0302398 A1 Sep. 30, 2021

(30) Foreign Application Priority Data

Mar. 25, 2020 (JP) .................. 2020-054698

(51) Int. Cl.
G01N 30/30 (2006.01)
G01N 30/02 (2006.01)
(52) U.S. Cl.
CPC ....... *G01N 30/30* (2013.01); *G01N 2030/025* (2013.01)
(58) Field of Classification Search
CPC .............................................. G01N 2030/025
See application file for complete search history.

(56) References Cited

U.S. PATENT DOCUMENTS 6,530,260 B1 * 3/2003 Mustacich ............. G01N 30/30
422/89
2012/0156019 A1 * 6/2012 Gong ....................... G06F 1/20
415/182.1
(Continued)

FOREIGN PATENT DOCUMENTS

CN 1180167 A 4/1998
CN 204667296 * 9/2015
(Continued)

OTHER PUBLICATIONS

Office Action dated Oct. 31, 2022 from the China National Intellectual Property Administration in CN Application No. 202011409504.0.
(Continued)

Primary Examiner — Jamel E Williams
Assistant Examiner — Alex T Devito
(74) Attorney, Agent, or Firm — Sughrue Mion, PLLC

(57) ABSTRACT

To suppress the influence of heat from an interface part on temperature control of a separation column and also to suppress the influence of room temperature fluctuation outside a main body. A gas chromatograph (1) includes a main body (2) having internal space, a column cartridge (4) disposed in the internal space of the main body (2) and including a case (20), a heater (18) and a separation column (16) for separating components in sample gas, the separation column being accommodated in the case (20) together with the heater (18), and the case (20) being provided with an intake port (26) through which air for cooling the separation column (16) is taken into the case (20), a sample gas supplier (6) for supplying a sample gas to the separation column (16), the sample gas supplier (6) being attached to the main body (2), and being fluidly connected to an inlet of the separation column (16), a detector (8) for detecting components separated in the separation column (16), the detector (8) being attached to the main body (2) and being fluidly connected to an outlet of the separation column (16), an interface part (10) adjusting a temperature of pipes (22; 24) connected to the inlet and the outlet of the separation column (16) in the internal space of the main body (2), a first fan (12) for supplying outside air of the main body (2) into the case (20) of the column cartridge (4) via the intake port (26), and a second fan (14) which is different from the first fan (12), and is for cooling an outer surface of the case (20) of the column
(Continued)

cartridge (4) by blowing outside air if the main body (2) to an outer surface of the case (20) of the column cartridge (4).

5 Claims, 2 Drawing Sheets

(56) References Cited

U.S. PATENT DOCUMENTS

| | | | | |
|---|---|---|---|---|
| 2014/0290491 A1* | 10/2014 | Kanai | ................ | G01N 30/6052 |
| | | | | 96/101 |
| 2015/0268201 A1 | 9/2015 | Kanai et al. | | |
| 2019/0033271 A1* | 1/2019 | Sabolis | .............. | G01N 30/6047 |

FOREIGN PATENT DOCUMENTS

| | | |
|---|---|---|
| JP | 2010-249730 A | 11/2010 |
| WO | 2014/064804 A1 | 5/2014 |

OTHER PUBLICATIONS

Japanese Office Action dated Mar. 7, 2023 in Japanese Application No. 2020-054698.
Chinese Office Action dated Jul. 13, 2023 in Chinese Application No. 202011409504.0.

* cited by examiner

GAS CHROMATOGRAPH

BACKGROUND OF THE INVENTION

1. Field of the Invention

The present invention relates to a gas chromatograph.

2. Description of the Related Art

In a gas chromatograph, it is common to house a separation column in a column oven to control the temperature of the separation column. On the other hand, a cartridge type separation column (hereinafter referred to as a column cartridge) has been proposed and implemented so that increasing the temperature and cooling of the separation column can be executed at high speed (see WO2016/009720A1). The column cartridge proposed in WO2016/009720A1 is configured in such a way that the separation column and the heater are integrated and housed in a small heat insulating case, and when the temperature of the separation column is increased, the separation column is directly heated by the heater, and when the separation column is cooled, air for cooling passes through the inside of the case.

In the gas chromatograph using such a column cartridge, an interface part for controlling the temperature of a pipe connected to an inlet and an outlet of the separation column is housed in the inside of a common housing (hereinafter, referred to as a main body) together with the column cartridge, and disposed close to the column cartridge.

SUMMARY OF THE INVENTION

In the gas chromatograph using the column cartridge as described above, when the separation column is cooled, a fan supplies air from the outside of the main body into the column cartridge and blows the air onto the separation column and the heater.

The interface part provided close to the column cartridge often controls the temperature of the pipe at the same temperature as a detector. If the interface part controls the temperature of the pipe to be higher than the temperature of the separation column, the heat of the interface part is transmitted to the inside of the column cartridge, and affects the temperature control of the separation column. For this reason, it is conceivable to take measures such as supplying outside air of the main body into the column cartridge during analysis so that the temperature of the separation column is not increased due to the heat from the interface part.

However, if outside air of the main body is supplied into the column cartridge during analysis, the accuracy of temperature control of the separation column may be impaired due to the influence of room temperature fluctuation. Therefore, it is not desirable to supply outside air of the main body into the column cartridge during analysis.

The present invention has been made in view of the above problem, and an object of the present invention is to suppress the influence of heat from the interface part on the temperature control of the separation column and also to suppress the influence of room temperature fluctuation outside the main body.

The gas chromatograph according to the present invention includes a main body having internal space, a column cartridge disposed in the internal space of the main body and including a case, a heater and a separation column for separating components in sample gas, the separation column being accommodated in the case together with the heater, and the case being provided with an intake port through which air for cooling the separation column is taken into the case, a sample gas supplier for supplying a sample gas to the separation column, the sample gas supplier being attached to the main body and being fluidly connected to an inlet of the separation column, a detector for detecting components separated in the separation column, the detector being attached to the main body and being fluidly connected to an outlet of the separation column, an interface part adjusting a temperature of a pipe connected to the inlet and the outlet of the separation column in the internal space of the main body, a first fan for supplying outside air of the main body into the case of the column cartridge via the intake port, and a second fan which is different from the first fan, and is for cooling an outer surface of the case of the column cartridge by blowing outside air of the main body to an outer surface of the case of the column cartridge.

The gas chromatograph according to the present invention includes, in addition to the first fan for supplying air into the column cartridge, the second fan for blowing air to the outer surface of the column cartridge to cool the column cartridge. Accordingly, heat transmitted from the interface part to the outer surface of the column cartridge is removed by the air blown by the second fan, and the influence of the heat from the interface part on the temperature control of the separation column is suppressed. As a result, it is no longer necessary to supply air from the outside of the main body into the column cartridge during the analysis, and, by stopping the operation of the first fan during the analysis, the influence of the room temperature fluctuation outside the main body on the temperature control of the separation column can also be suppressed.

DETAILED DESCRIPTION OF THE INVENTION

Hereinafter, an embodiment of the gas chromatograph according to the present invention will be described with reference to the accompanying drawings.

Figure 1:
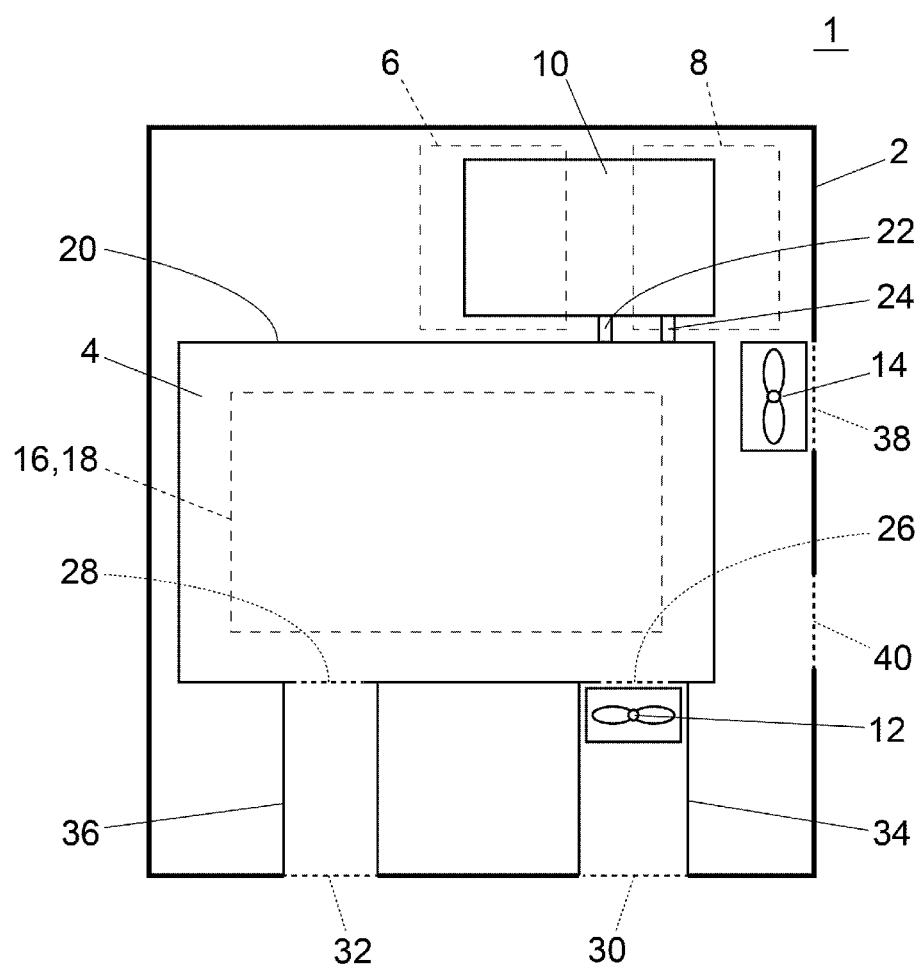
FIG. 1 is a schematic configuration diagram showing an embodiment of a gas chromatograph.

FIG. 1 is a schematic view of an internal configuration of a main body 2 of a gas chromatograph 1 as viewed from above.

The main body 2 of the gas chromatograph 1 has internal space, and a column cartridge 4, an interface part 10, a first fan 12, and a second fan 14 are disposed in the internal space. Further, a sample gas supplier 6 and a detector 8 are attached to the main body 2.

In the column cartridge 4, a separation column 16 for separating a component in a sample is housed together with a heater 18 in a heat insulating case 20. The separation column 16 is configured to be heated directly by the heater 18. Although not shown, a temperature sensor is also provided inside the case 20. Although detailed description of a structure in the column cartridge 4 is omitted, for example, the structure disclosed in WO2014/064804A1 can be employed.

An inlet of the separation column 16 is fluidly connected to the sample gas supplier 6 via a pipe 22, and an outlet of the separation column 16 is fluidly connected to the detector 8 via a pipe 24. The sample gas supplier 6 is configured to vaporize an injected liquid sample and transfer the vaporized sample to the separation column 16 by carrier gas. The detector 8 is for detecting a component separated in the separation column 16, and a thermal conductivity detector (TCD), a flame ionization detector (FID), a flame photometric detector (FPD), and the like can be used as the detector 8.

The interface part 10 is provided on the side (upper side in the diagram) of the column cartridge 4. The interface part 10 is for adjusting the temperature of the pipes 22 and 24 connected to the inlet and the outlet of the separation column 16, respectively. Although not shown, the interface part 10 includes a heat exchange block that is in contact with the pipes 22 and 24 and exchanges heat with the pipes 22 and 24, a heater for heating the heat exchange block, and further a temperature sensor for detecting the temperature of the heat exchange block.

An intake port 26 and an exhaust port 28 are provided on a lateral surface (second lateral surface) positioned on the opposite side of a lateral surface (first lateral surface) close to the interface part 10 of lateral surfaces of the case 20 of the column cartridge 4. The intake port 26 is an opening for taking in air for cooling the separation column 16 and the heater 18 into the case 20, and the exhaust port 28 is an opening for exhausting air inside the case 20.

Lateral surfaces of the main body 2 are provided with openings 30, 32, 38, and 40. The opening 30 is provided at a position facing the intake port 26 of the column cartridge 4, and the opening 32 is provided at a position facing the exhaust port 28 of the column cartridge 4. The intake port 26 and the opening 30 are separated from each other, and the exhaust port 28 and the opening 32 are separated from each other. A duct 34 is provided between the intake port 26 and the opening 30, and a duct 36 is provided between the exhaust port 28 and the opening 32. The ducts 34 and 36 are made from a material having excellent thermal conductivity such as aluminum.

The first fan 12 is for supplying outside air of the main body 2 to the inside of the column cartridge 4 through the intake port 26. The first fan 12, which is provided between the intake port 26 and the opening 30 in the present embodiment, may be provided outside the main body 2. When the first fan 12 operates, air is taken in from the outside to the inside of the main body 2 through the opening 30, and the air is supplied to the inside of the column cartridge 4 through the duct 34. The air supplied into the column cartridge 4 exchanges heat with the separation column 16 and the heater 18, and then is discharged to the outside of the main body 2 through the exhaust port 28, the duct 36, and the opening 32.

The second fan 14 is provided so as to take in air from the outside to the inside of the main body 2 through the opening 38 and blow the air to a portion close to the interface part 10 of an outer surface of the column cartridge 4. The second fan 14, which is provided inside the opening 38 in the present embodiment, may be provided outside the opening 38. The air blown to the column cartridge 4 by the second fan 14 exchanges heat with the outer surface of the column cartridge 4, and then is discharged from the opening 40 to the outside of the main body 2.

Figure 2:
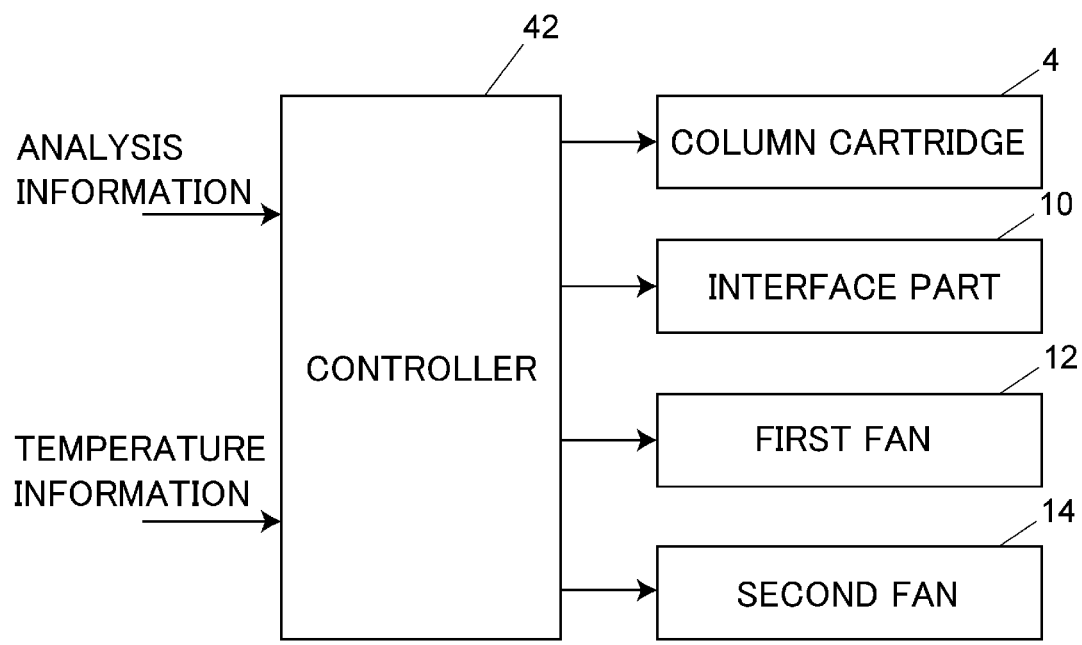
FIG. 2 is a block diagram showing an example of a control system of the embodiment.

As shown in FIG. 2, the temperature control operation of the separation column 16 in the column cartridge 4, the temperature control operation of the pipes 22 and 24 in the interface part 10, the operation of the first fan 12, and the operation of the second fan 14 are controlled by a controller 42. The controller 42 is a function realized by a CPU executing a predetermined program.

Analysis information and temperature information are input to the controller 42, and the controller 42 controls the operation of the column cartridge 4, the interface part 10, the first fan 12, and the second fan 14 based on these pieces of information. The analysis information includes an instruction to start analysis, a temperature condition of the separation column 16 during the analysis, and an instruction to cool the separation column 16. The temperature information includes information of a temperature detected by the temperature sensor provided in the column cartridge 4 and information of a temperature detected by the temperature sensor provided in the interface part 10.

The controller 42 is configured to operate the first fan 12 only when the separation column 16 in the column cartridge 4 should be cooled during standby time after the analysis is finished, and stop the operation of the first fan 12 during analysis. On the other hand, the controller 42 is configured to operate the second fan 14 both during the analysis and during the standby time.

A control temperature of the pipes 22 and 24 in the interface part 10 is often set to a temperature higher than a control temperature of the separation column 16 in the column cartridge 4 (for example, a temperature equivalent to the temperature of the detector 8). When the temperature of the interface part 10 is higher than the temperature inside the column cartridge 4, the heat of the interface part 10 is transmitted to the inside of the column cartridge 4. However, in the present embodiment, during the analysis, the second fan 14 operates and outside air of the main body 2 is blown to the outer surface of the column cartridge 4, so that the heat transmitted from the interface part 10 to the outer surface of the column cartridge 4 is removed before entering the inside of the column cartridge 4. In this manner, the influence of heat from the interface part 10 on the temperature control of the separation column 16 during the analysis is suppressed. On the other hand, during the analysis, the operation of the first fan 12 is stopped, and the outside air of the main body 2 is not supplied into the column cartridge 4. For this reason, even if the room temperature outside the main body 2 fluctuates during the analysis, the temperature control of the separation column 16 is less likely to be affected by the room temperature fluctuation.

Note that, since the intake port 26 and the exhaust port 28 of the column cartridge 4 communicate with the outside of the main body 2 through ducts 34 and 36, respectively, even if the operation of the first fan 12 is stopped, the outside air of the main body 2 may flow into the column cartridge 4. However, the intake port 26 and the exhaust port 28 of the column cartridge 4 are provided apart from the openings 30 and 32, respectively, and the air flowing into the main body 2 from the openings 30 and 32 exchanges heat with the air in the main body 2 via the thermally-conductive ducts 34 and 36. For this reason, the influence of the room temperature fluctuation on the temperature inside the column cartridge 4 is suppressed.

The embodiment described above is merely an example of embodiments of the gas chromatograph according to the present invention. An embodiment of the gas chromatograph according to the present invention is as shown below.

One embodiment of the gas chromatograph according to the present invention includes a main body having internal space, a column cartridge disposed in the internal space of the main body and including a case, a heater and a separation column for separating components in sample gas, the separation column being accommodated in the case together with the heater, and the case being provided with an intake port through which air for cooling the separation column is taken into the case, a sample gas supplier for supplying a sample gas to the separation column, the sample gas supplier being attached to the main body and being fluidly connected to an inlet of the separation column, a detector for detecting components separated in the separation column, the detector being attached to the main body and being fluidly connected to an outlet of the separation column, an interface part adjusting a temperature of a pipe connected to the inlet and the outlet of the separation column in the internal space of the main body, a first fan for supplying outside air of the main body into the case of the column cartridge via the intake port, and a second fan which is different from the first fan, and is for cooling an outer surface of the case of the column cartridge by blowing outside air of the main body to an outer surface of the case of the column cartridge.

In a first aspect of the one embodiment, the second fan is provided so as to blow air to an area, which is close to the interface part, of the outer surface of the case of the column cartridge. According to such an aspect, the heat transmitted from the interface part to the case of the column cartridge can be efficiently removed, and the influence of the heat from the interface part on the temperature control of the separation column can be suppressed.

In a second aspect of the one embodiment, the main body has an opening for guiding outside air of the main body to the intake port of the column cartridge, and the intake port and the opening are arranged apart from each other so that heat exchange is performed between air flowing into the main body through the opening and air which has been existed in the internal space of the main body. In such an aspect, the influence of the room temperature fluctuation outside the main body on the temperature control of the separation column is suppressed. This second aspect can be combined with the first aspect.

In the second aspect, a duct formed from a heat conductive material may be provided between the opening and the intake port. In this manner, when the separation column is cooled, outside air of the main body can be efficiently supplied into the column cartridge.

In a third aspect of the one embodiment, the case of the column cartridge has a first lateral surface and a second lateral surface positioned on opposite sides to each other, and the interface part is provided close to the first lateral surface, and the intake port is provided on the second lateral surface. By such an aspect, air heated by the interface part is less likely to be taken in from the intake port, and the influence of heat from the interface part on the temperature control of the separation column is suppressed. This third aspect can be combined with at least one of the first and second aspects described above.

A fourth aspect of the one embodiment further includes a controller configured to control operation of the first fan and the second fan, and the controller is configured to operate the second fan at least during analysis of a sample, and operate the first fan only when the separation column is cooled during standby time after analysis of a sample is finished. By such an aspect, the influence of heat from the interface part on the temperature control of the separation column can be suppressed without supplying outside air of the main body into the column cartridge during analysis of a sample. Since the outside air of the main body is not supplied into the column cartridge during the analysis of a sample, even if the room temperature outside of the main body fluctuates during the analysis, the influence that the fluctuation has on the temperature control of the separation column is reduced.

This fourth aspect can be combined with at least one of the first, second, and third aspects described above.

In the fourth aspect, the controller may be configured to operate the second fan even during the standby time. In this manner, the heat from the interface part is less likely to be transmitted to the separation column when the separation column is cooled, so that cooling efficiency of the separation column can be improved.

DESCRIPTION OF REFERENCE SIGNS

1 Gas chromatograph
2 Main body
4 Column cartridge
6 Sample gas supplier
8 Detector
10 Interface part
12 First fan
14 Second fan
16 Separation column
18 Heater
20 Case
22, 24 Pipe
26 Intake port
28 Exhaust port
30,32,38,40 Opening
34, 36 Duct
42 Controller

What is claimed is:

1. A gas chromatograph comprising:
a main body having internal space;
a column cartridge disposed in the internal space of the main body and including a case, a heater and a separation column for separating components in sample gas, wherein the separation column is accommodated in the case together with the heater, the case is provided with an intake port through which air for cooling the separation column is taken into the case, the case includes a first lateral surface, a second lateral surface positioned on an opposite side with respect to the first lateral surface, and another surface which extends between the first lateral surface and the second lateral surface and intersects with the first lateral surface the and second lateral surface, the intake port is provided on the second lateral surface, and pipes, each connected to an inlet and an outlet of the separation column, exit from the first lateral surface of the case;
a sample gas supplier for supplying a sample gas to the separation column, the sample gas supplier being attached to the main body and being fluidly connected to the inlet of the separation column;
a detector for detecting components separated in the separation column, the detector being attached to the main body and being fluidly connected to the outlet of the separation column;
an interface part that is provided separately from the column cartridge in the internal space of the main body, and includes a heat exchange block and a heater for heating the heat exchange block, wherein the heat exchange block is in contact with the pipes so as to adjust the temperature of the pipes;
a first fan provided to face to the second lateral surface and for supplying first air from outside of the main body into the case of the column cartridge via the intake port; and
a second fan which is different from the first fan, and is for cooling the column cartridge directly by intaking second air from outside of the main body and blowing the second air from outside the main body to the column cartridge, wherein the first lateral surface of the case of the column cartridge, from which the pipes exit, faces the interface part, and the second fan is provided to face to an area, which is closer to the first lateral surface than the second lateral surface, of the another surface of the case of the column cartridge and blows the second air from outside of the main body directly to the area so as to dissipate the heat which is transferred to the column cartridge via the pipes.

2. The gas chromatograph according to claim 1, wherein the main body has an opening for guiding the first air from outside of the main body to the intake port of the column cartridge, and the intake port and the opening are arranged apart from each other so that heat exchange is performed between the first air flowing into the main body through the opening and air in the internal space of the main body.

3. The gas chromatograph according to claim 2, wherein a duct formed from a heat conductive material is provided between the opening and the intake port.

4. The gas chromatograph according to claim 1, further comprising:

a controller configured to control operation of the first fan and the second fan, wherein the controller is configured to operate the second fan at least during analysis of a sample, and operate the first fan only when the separation column is cooled during standby time after analysis of a sample is finished.

5. The gas chromatograph according to claim 4, wherein the controller is configured to operate the second fan even during the standby time.

\* \* \* \* \*